(12) United States Patent
Yamamoto et al.

(10) Patent No.: US 8,645,718 B2
(45) Date of Patent: Feb. 4, 2014

(54) APPARATUS AND METHOD FOR SAMPLING POWER CONSUMPTION

(75) Inventors: Masao Yamamoto, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 859 days.

(21) Appl. No.: 12/545,447

(22) Filed: Aug. 21, 2009

(65) Prior Publication Data
US 2010/0058079 A1    Mar. 4, 2010

(30) Foreign Application Priority Data

Aug. 22, 2008 (JP) ................. 2008-213545
Jan. 26, 2009 (JP) ................. 2009-013858
Aug. 12, 2009 (JP) ................. 2009-187169

(51) Int. Cl.
*G06F 1/00* (2006.01)
(52) U.S. Cl.
USPC .......................................... 713/300
(58) Field of Classification Search
USPC ................................ 713/300–340
See application file for complete search history.

(56) References Cited

U.S. PATENT DOCUMENTS

| | | | |
|---|---|---|---|
| 6,647,501 B1 | 11/2003 | Ninomiya | |
| 7,234,068 B2 | 6/2007 | Nonogaki et al. | |
| 7,243,243 B2 * | 7/2007 | Gedeon | 713/300 |
| 7,412,353 B2 | 8/2008 | Borkar et al. | |
| 7,430,672 B2 * | 9/2008 | Rotem et al. | 713/300 |
| 7,529,947 B2 * | 5/2009 | Paver | 713/300 |
| 7,970,566 B2 * | 6/2011 | Moore et al. | 702/89 |
| 2003/0191791 A1 | 10/2003 | Cyran et al. | |
| 2003/0191976 A1 | 10/2003 | Cyran et al. | |
| 2003/0191986 A1 | 10/2003 | Cyran et al. | |
| 2004/0268159 A1 | 12/2004 | Aasheim et al. | |
| 2005/0044438 A1 | 2/2005 | Nonogaki et al. | |
| 2007/0028129 A1 * | 2/2007 | Schumacher et al. | 713/320 |
| 2007/0074011 A1 | 3/2007 | Borkar et al. | |
| 2007/0124622 A1 | 5/2007 | Johns et al. | |

FOREIGN PATENT DOCUMENTS

| | | |
|---|---|---|
| JP | 07-168726 | 7/1995 |
| JP | 2000-305670 | 11/2000 |
| JP | 2001/034499 | 2/2001 |
| JP | 2003-345472 | 12/2003 |
| JP | 2005-25754 | 1/2005 |
| JP | 2005-62106 | 3/2005 |
| JP | 2007/042091 | 2/2007 |
| JP | 2008-004094 | 1/2008 |
| JP | 2009-510618 | 3/2009 |

OTHER PUBLICATIONS

Frank Bellosa, "The Benefits of Event-Driven Energy Accounting in Power-Sensitive Systems", pp. 37-42.
Japanese Notification of Reason for Refusal dated Feb. 26, 2013 corresponds to Japanese Patent Application No. 2009-187169.

* cited by examiner

*Primary Examiner* — Tim T Vo
*Assistant Examiner* — Trisha Vu
(74) *Attorney, Agent, or Firm* — Staas & Halsey LLP

(57) ABSTRACT

In the computer apparatus which has a processing unit, a power consumption measuring unit, and a power counter, the power consumption of running programs on the processing unit is measured at arbitrary constant period, wherein the measuring value is integrated to the power counter. When the power counter overflows, the processing unit is interrupted for sampling information required for analysis. Then the processing unit which received the interruption executes a sampling of the power consumption base. So, power consumption based sampling and profiling becomes to be enabled.

10 Claims, 13 Drawing Sheets

APPARATUS AND METHOD FOR SAMPLING POWER CONSUMPTION

CROSS REFERENCES TO RELATED APPLICATIONS

This application is based upon and claims the benefit of priority from prior Japanese Patent Application No. 2008-213545, filed Aug. 22, 2008, prior Japanese Patent Application No. 2009-013858, filed Jan. 26, 2009 and prior Japanese Patent Application No. 2009-187169, filed Aug. 12, 2009, the entire contents of which are incorporated herein by reference.

FIELD

The embodiments discussed herein are related to a technology which measures a power consumption of running programs on a CPU (Central Processing Unit).

BACKGROUND

Conventionally, sampling data is well used for the analysis of program behavior and for a performance tuning. For instance, a conventional apparatus for measuring an electric power consumed by running programs on the CPU first samples information (such as an executing instruction address or a Process ID) associated with identified execution programs or functions. Next it analyzes the data and profiles the executed programs. So we can grasp a behavior of programs or figure out improvement points of its performance.

As a system for sampling the above mentioned information, a time based sampling system is used well. Its reason is that a time based performance or a processing performance has been highly called for system requirements in computer design, programming, and construction or management of the system until now.

However, the power consumption becomes the first requirement for those systems now. Therefore, a power consumption based sampling is needed for running programs or executing instructions.

On the other hand, as a conventional program behavior analysis method in the viewpoint of the power consumption, there is a technique for utilizing a performance counter with which the processor is equipped.

It is the technique of counting a frequency of occurrence of some events related to the power consumption by a performance counter, and estimating the power consumption by using the electric power equivalent or formula corresponding to each event at analyzing (for example, refer to non-patent literature 1; F. Bellosa, "The Benefits of Event-Driven Energy Accounting in Power-Sensitive Systems," Proc. SIGOPS European Workshop, ACM Press, 2000, pp. 37-42).

However, the above mentioned technique has the following problems. First, it cannot make a power consumption profile (items analysis of power consumption according to a running program on the CPU). That is, there is the problem that the power consumption of the whole system within a measurement period is only known, but the rate of the power consumption for every running program as the items is not known.

On the other hand, in the non-patent literature 1, by using an improved kernel, a counter value is saved for every running program and the profile based on the power consumption of a program is made possible. But, in a general kernel, the profile analysis cannot be realized.

Moreover, it has a problem in the point of accuracy. First of all, the technique gives only an estimated value, but its value is not indicating power consumption correctly. Furthermore, since number of the performance counter is limited, there is also a problem that events required for electric power calculation are simultaneously un-extractable depending on a processor.

In that case, since the event is gathered dividing into several-time and it will do a synthetic calculation when analyzing it, the possibility of not reflecting correct power consumption rises more and more, and uneasiness remains there in the point of reliability or accuracy.

As for the above mentioned problem, in the time base sampling, power consumption was also recorded with an instruction address information etc. for every sampling, and the profile of power consumption of the real measurement base which is not an estimate is realized with the patent document 1 (Japanese Patent Laid-Open Publication No. 2005-25754).

However, in the patent documents 1, it is difficult to find the program of large power consumption correctly.

For example, FIG. 13 shows the sampling result of power consumption by time base when "the program A" or "the program B" was executed in the CPU core (the graph shows "time" for a horizontal axis and "power consumption" for a vertical axis).

Power consumption by the program A is small, but execution time by the program A occupies a greater portion. On the other hand, power consumption by the program B is large, but execution time by the program B occupies a less portion.

In such case, although essentially the program B should be found out, the sampling means cannot find out it since timing of extraction at the program B shifts from each sampling time.

Thus, the time base sampling is the technique which information required for analysis is extracted at every constant period (for example, every ms) and the items of the running program are analyzed based on the number of sampling from the extraction data (profile). Analysis which is statistically meaningful can be performed in relation only with time.

Thus, such a mismatch between power consumption measurement and its profile arises from sampling the profile of the power consumption with the time base. That is, in order to profile power consumption, the data sampling is requested to be done with the power consumption base.

SUMMARY

A computer apparatus measures power consumption for every arbitrary constant period and integrates a measured value of the power consumption to a power counter. When the power counter overflowed, it puts interruption into a CPU by an overflow interruption means, and the CPU which received interruption starts to execute a sampler program which performs sampling or profiling of the power consumption base.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, preferred embodiments of the present invention will be concretely described with referent to the drawings. The present invention relates to design technologies of a computer, construction and management of a system, and programming.

Especially, it is used in the computer design, and the systems configuration and management at the time of making power-saving into requirements, or the basic data extraction for program optimization. It also is considerable to be used as a trigger for process scheduling which OS (Operating System) performs.

In the field mentioned above, the present invention offers the data sampling technology for profiling by the operation program on a computer system (for example, items analysis of the operation program in expended hours).

A processor, a mother board, etc. can be considered as application products in which the present invention is mounted. Moreover, performance tools such as a profiler etc., OS etc., can be considered as application products using the structure of the present invention.

Below, four cases are taken up. In case of the embodiment 1, it is shown that when an integral power consumption counter (hereafter, only expressed as the power counter) overflows, the computer equipment puts interruption into CPU and samples information required for profiling.

In case of the embodiment 2, it is shown that when the power counter prepared in a program exceeds the threshold value set up beforehand, the time base program samples information required for profiling.

Moreover, in case of the embodiment 3, even if there is delay at the time of a sampling, the technique for sampling the information on the right operation program is shown.

Furthermore, in case of the embodiment 4, it is shown that the computer equipment has the CPU consisting of two or more cores and measures a power consumption profile per core.

In addition, the mark for the common component of the figure used in cases of the operation 1-4 is the same.

Embodiment 1

Figure 1:
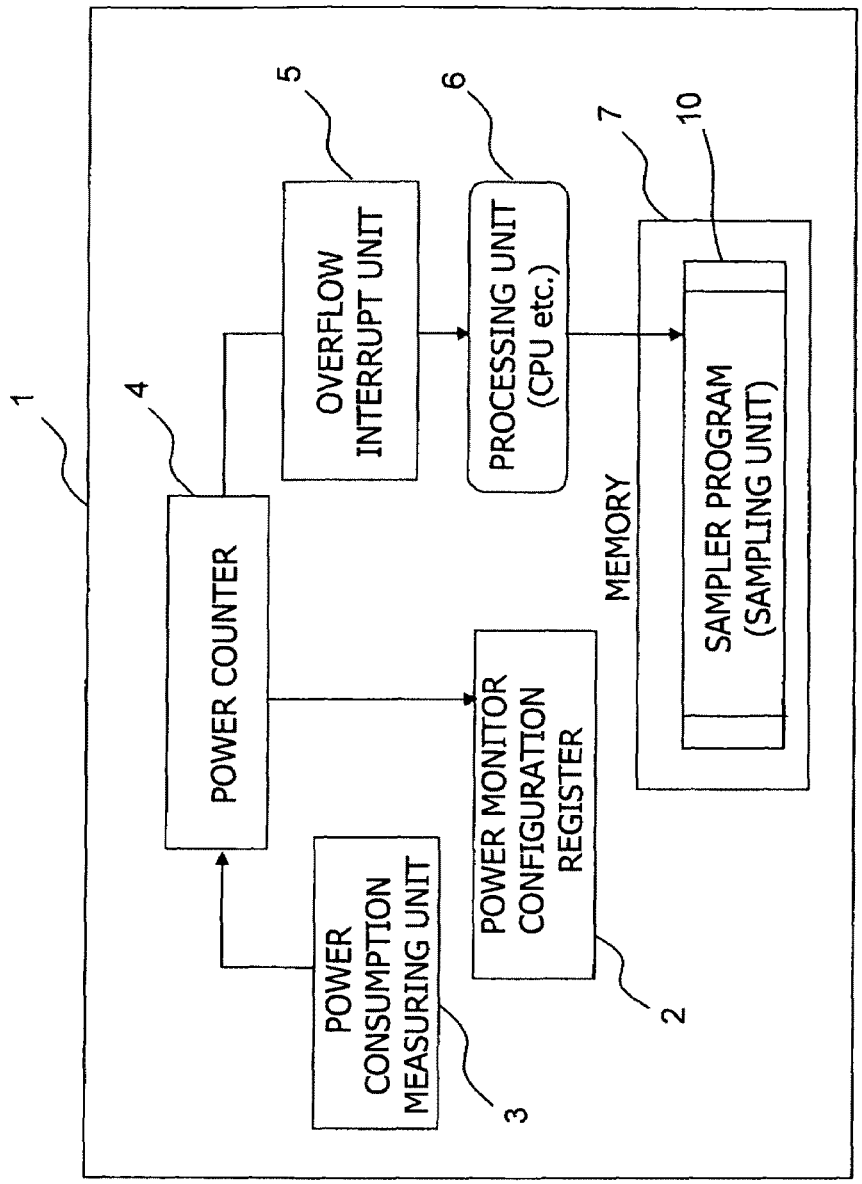
FIG. 1 illustrates an example of composition of the computer apparatus according to an embodiment (Part 1).

FIG. 1 illustrates an example of composition of the computer apparatus according to the embodiment 1.

The computer apparatus 1 has an power consumption measuring unit 3 which measures the electric power supplied to a processing unit 6 (CPU etc.) at predetermined constant period, and the power monitor configuration register 2 which controls and surveys motion of the power counter 4.

Furthermore, the computer apparatus 1 has the power counter 4 which integrates a power consumption value measured at every constant period, the overflow interrupt unit 5 which puts interruption for sampling into the processing unit 6 when the power counter 4 overflows, and the processing unit 6 which controls execution of interruption received from the overflow interrupt unit 5.

Moreover, the computer apparatus 1 has an executable module of a sampler program (sampling unit) 10 which extracts information required for profiling, for example, information such as an instruction address and a process ID, and the memory 7 which holds the extracted data for every overflow interruption. The sampler program 10 is executed by the processing unit 6.

In addition, the power counter 4 can be read-out or written by the program. In this case, the power counter is used as a 32-bit counter which the power per a count equals 1 watts.

Moreover, a survey condition of the power monitor configuration register 2 can be set up by the program, and operation of the power counter 4 is controlled by the following control bit.

"bit #0" stands for a counter stop bit (counter freeze bit). If it is "1", a count operation is suspended, and if it is "0", the count operation is validated.

"bit #1" stands for overflow interruption effective bit (overflow interrupt bit). If it is "1", interrupt instruction at overflow of the power counter 4 is given to the CPU. The counter freeze bit is set to "1" (setup), and the power counter value 4 is automatically suspended by hardware.

When it is "0", even if the power counter overflows, it is made to perform neither interruption nor the set of freeze bit.

Figure 2:
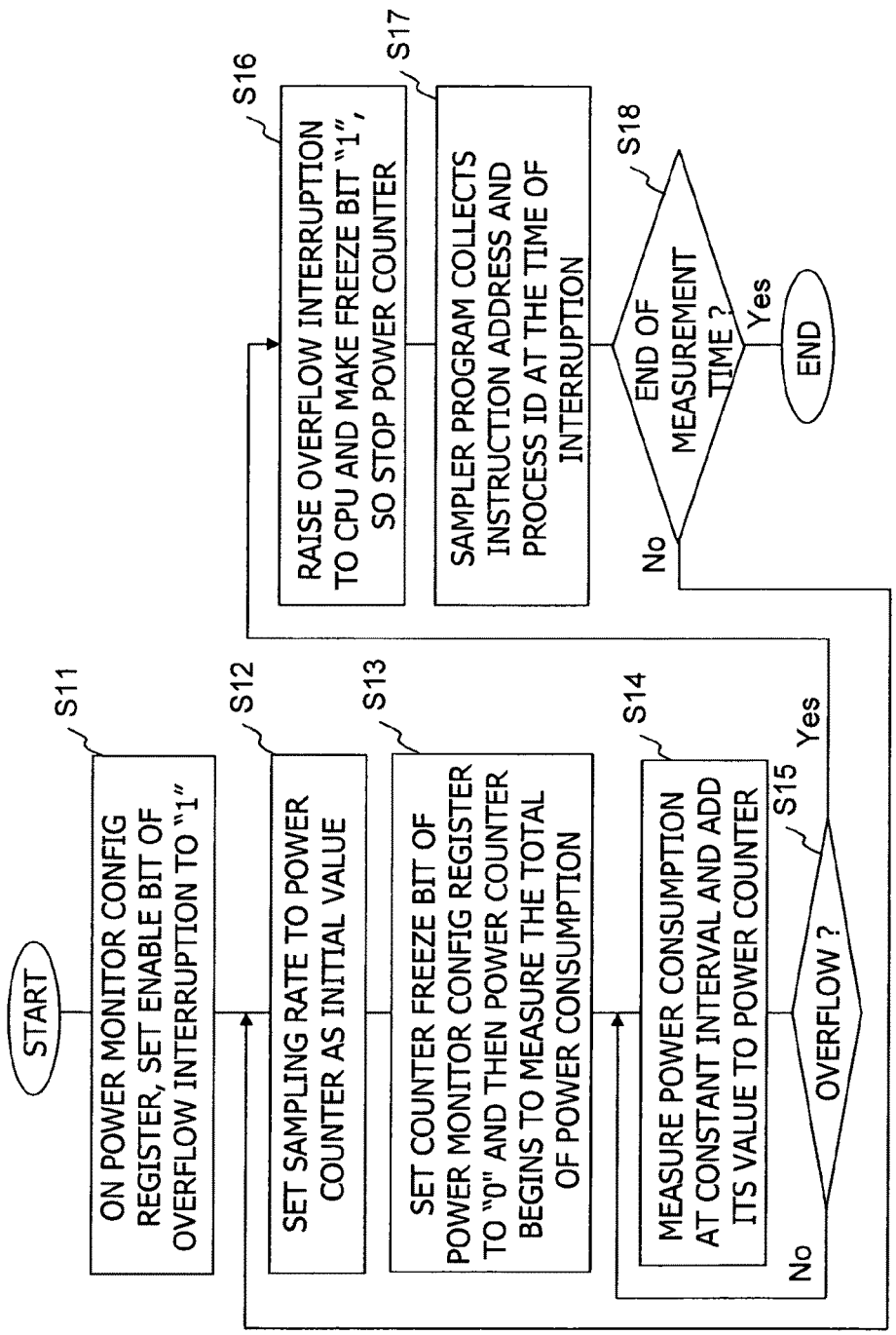
FIG. 2 illustrates an operation flow of sampling by an overflow interrupt control according to an embodiment.

FIG. 2 illustrates the operation flow of sampling by the overflow interrupt control according to the embodiment 1.

First, in Step S11, the sampler program 10 sets overflow interrupt bit of the power monitor configuration register 2 to "1".

Next, in Step S12, a sampling rate is set up by the sampler program 10. Specifically, an initial value of the power counter 4 is set to overflow at the expected value R.

For example, the sampler program 10 writes 0 xffff_ffff-0xc350=0xc350 (="0xffff3caf") as an initial value to the power counter 4, so that the power counter 4 may overflow at every 50,000 counts (50,000=0xc350) when the sampling rate is 50 kW/count.

Furthermore, in Step S13, the counter freeze bit of the power monitor configuration register 2 is set to "0" and operation of the power counter value 4 is made to start by the sampler program 10.

In Step S14, the power counter 4 which became effective measures the power consumption at every predetermined constant period (for example, 1 μsec.), and integrates the power consumption which is measured at the sampling rate.

And when the power counter 4 overflows in Step S15, the overflow interrupt unit 5 will put interruption into the processing unit 6 in Step S16, wherein simultaneously, freeze bit of the power monitor configuration register 2 will be set to "1" and operation of the power counter 4 will be stopped automatically.

In Step S15, when the power counter value 4 does not overflow, the program returns to Step S14 and measurement and integration of power consumption are repeated.

Next, in Step S17, information required for profile analysis, for example, including an instruction address or a process ID etc. which the program during executing interruption can be specified at the time of analysis is extracted by the sampler program 10 (sampling unit).

And in Step S18, the sampler program 10 judges based on the predetermined measuring period, whether a series of the power consumption samplings were completed or not, and when these still are not an end, the processing after Step S12 will be repeated.

Embodiment 2

Figure 3:
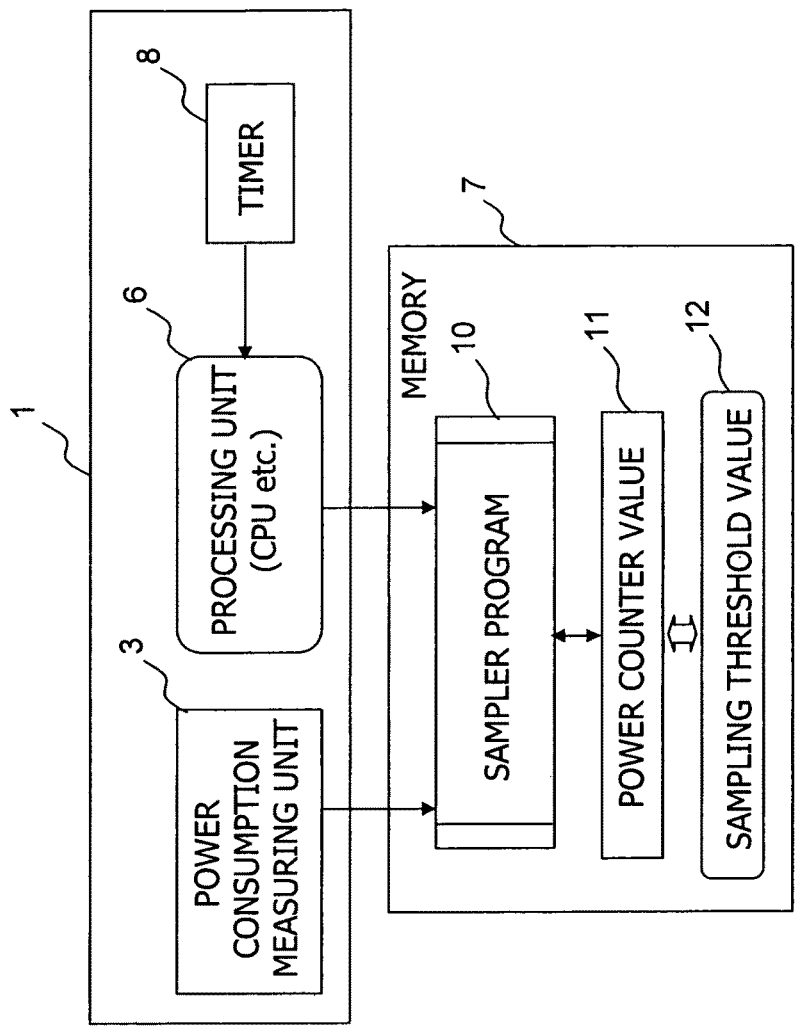
FIG. 3 illustrates an example of composition of the computer apparatus according to an embodiment (Part 2).

FIG. 3 illustrates the example of composition of the computer apparatus according to the embodiment 2. The embodiment 2 shows that the sampler program 10 operated by time base performs sampling of the power consumption base.

The computer apparatus 1 has the power consumption measuring unit 3 to measure the power consumption supplied to the processing unit 6 from the power supply for every predetermined period, wherein the processing unit 6 controls the sampler program 10 which performs the sampling using the timer 8.

Furthermore, the computer apparatus 1 has the power counter value 11 and the sampling threshold value 12 for taking the measured value from the power consumption measuring unit 3 within the sampler program 10. And the computer apparatus 1 has an execution module of the sampler program 10 which extracts information required for analysis, and the memory 7 holding the extracted data.

In addition, the data measured in the power consumption measuring unit 3 is possible to be read-out by the sampler program 10.

Figure 4:
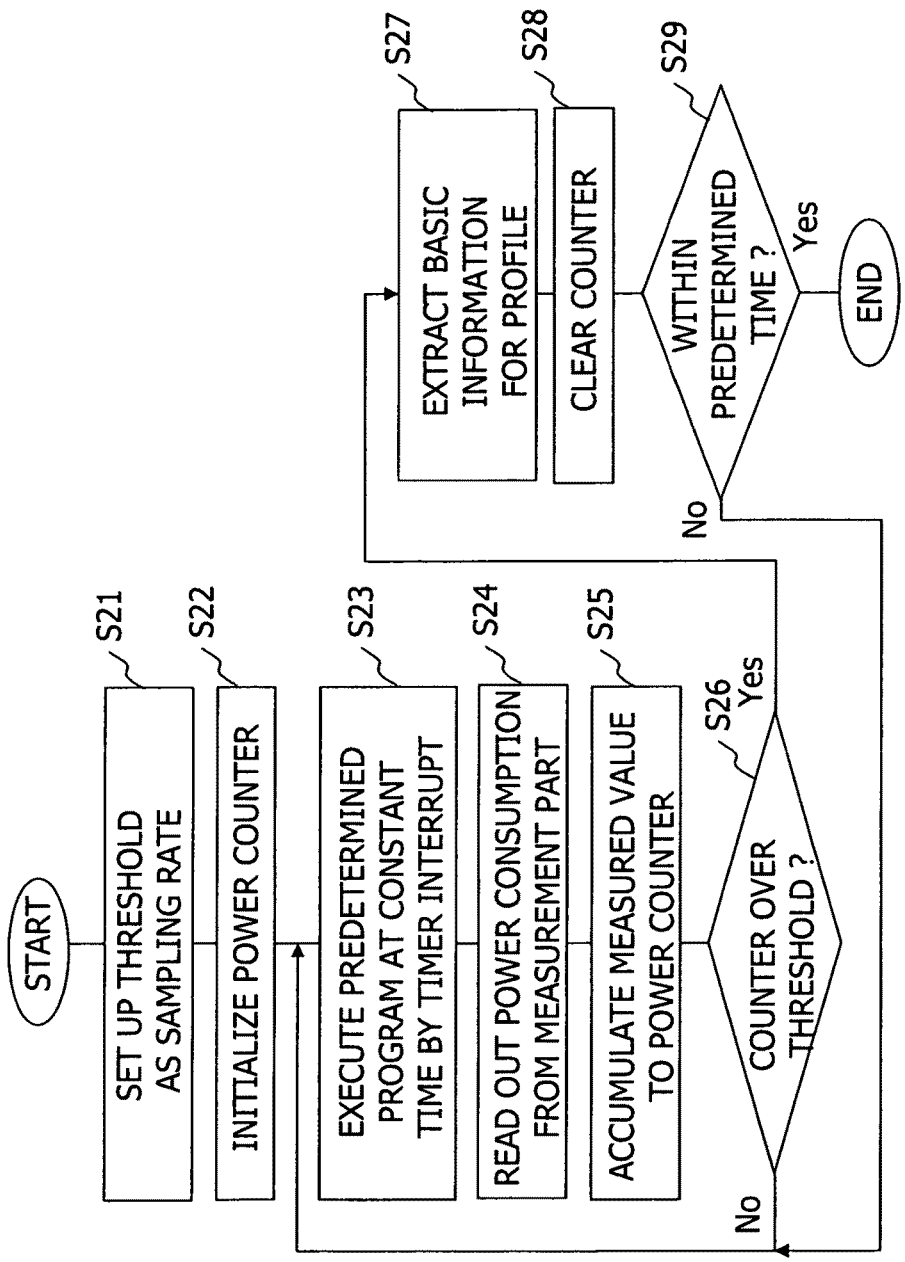
FIG. 4 illustrates a processing flow of power consumption sampling by a power counter of the program according to an embodiment.

FIG. 4 illustrates the processing flow of power consumption sampling by the power counter of the program in the embodiment 2.

First, in Step S21, the threshold value (namely, sampling rate) of the sampling threshold value 12 is set up in the sampler program 10. And in Step S22, the sampler program 10 initializes the power counter value 11 to zero, and the counter operation is started.

In Step S23, using the existing timer interruption by the timer 8, etc., the sampler program 10 executes sampling of information required for analysis at every constant period. Next, in Step S24, whenever the sampler program 10 is executed, it performs power consumption measurement of processing unit 6. And in Step S25, it integrates the measured value into the power counter value 11.

Furthermore, in Step S26, continuously the sampler program 10 compares the sampling value of the power counter value 11 after integration with the threshold value set to the sampling threshold value 12. When the counter value exceeds the threshold value, in Step S27, the sampler program 10 samples (extracts) information including an instruction address, a process ID, etc., required for profile analysis.

And in Step S28, the sampler program 10 carries out the zero clear of the power counter value 11 and makes counter operation start again. Furthermore, in Step S29, it judges whether the predetermined measuring time set up beforehand passed or not, and when measuring time still is remained, the processing after Step S23 is repeated.

Figure 5:
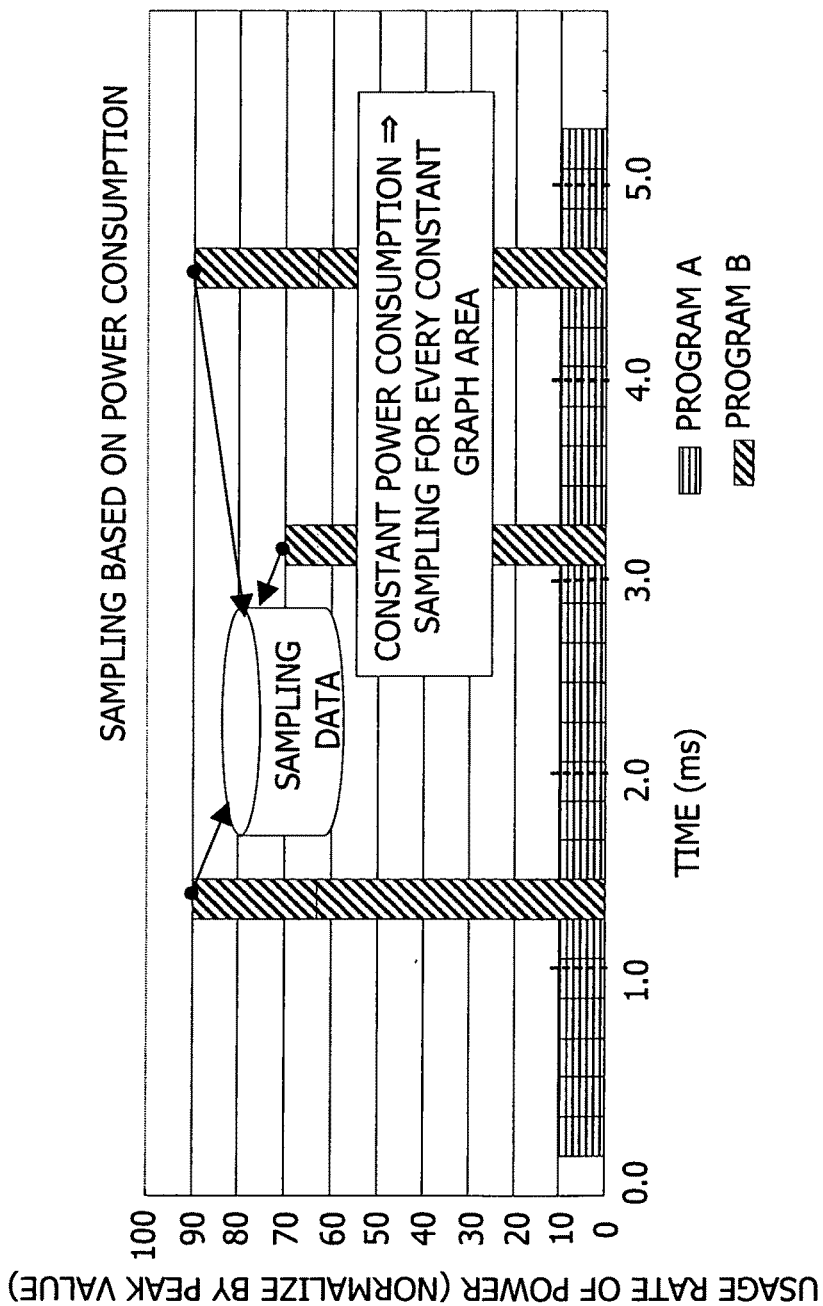
FIG. 5 illustrates the program data extracted by sampling of power consumption base according to an embodiment.

FIG. 5 illustrates an example of the program data extracted by sampling of the power consumption base according to the embodiment 2. The result of a sampling of a power consumption base is shown by the graph which the horizontal axis shows time and the vertical axis shows power consumption.

In the present invention, the highly precise profile of the executed program become possible by the measurement based on amount of power consumption (electric power× time). Extraction of the "program B" of a big power consumption which was not found out correctly in conventional time base sampling becomes to be enabled by the present invention.

Embodiment 3

The embodiment 3 shows an example for a sampling of power consumption data in case that there is a measurement delay as extension of the embodiment 1. Here, as illustrated in FIG. 1, the case which measurement of power consumption is performed in the CPU exterior is treated.

Figure 6:
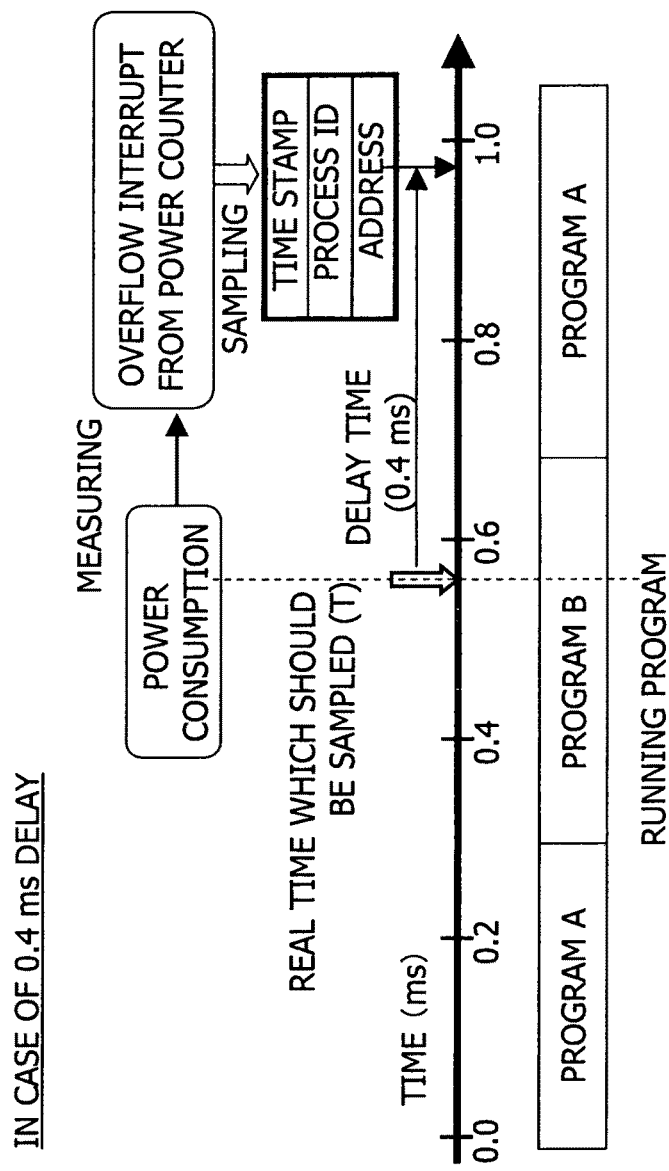
FIG. 6 is a figure explaining an influence by delay of the time for sampling of power consumption.

FIG. 6 is a figure which explains the influence by the delay at the time of power consumption sampling. It is thinkable that the time which cannot be disregarded as a sampling, i.e., "delay", arises until an interruption is put into the processing unit 6 and an execution control shifts to the sampler program 10, after the power counter 4 overflows.

In that case, the timing actually executed by the sampler program 10 has already shifted, and mistaken information may be extracted.

When the value of the power consumption measured for every constant period is integrated into the power counter 4 and the power counter 4 overflows, as illustrated in FIG. 6, the power consumption measuring unit 3 puts interruption into the processing unit 6, and shifts its execution control to the prepared sampler program.

The extracted power consumption data is correlated with information such as a time stamp according to the timer 8, a process ID, an address, etc.

For example, if there is delay of 0.4 ms, the program which should be extracted in the true time (T) is the program B (correct answer), but since there has delay in the electric power measurement, it is conceivable that information about the program A may be extracted.

Figure 7:
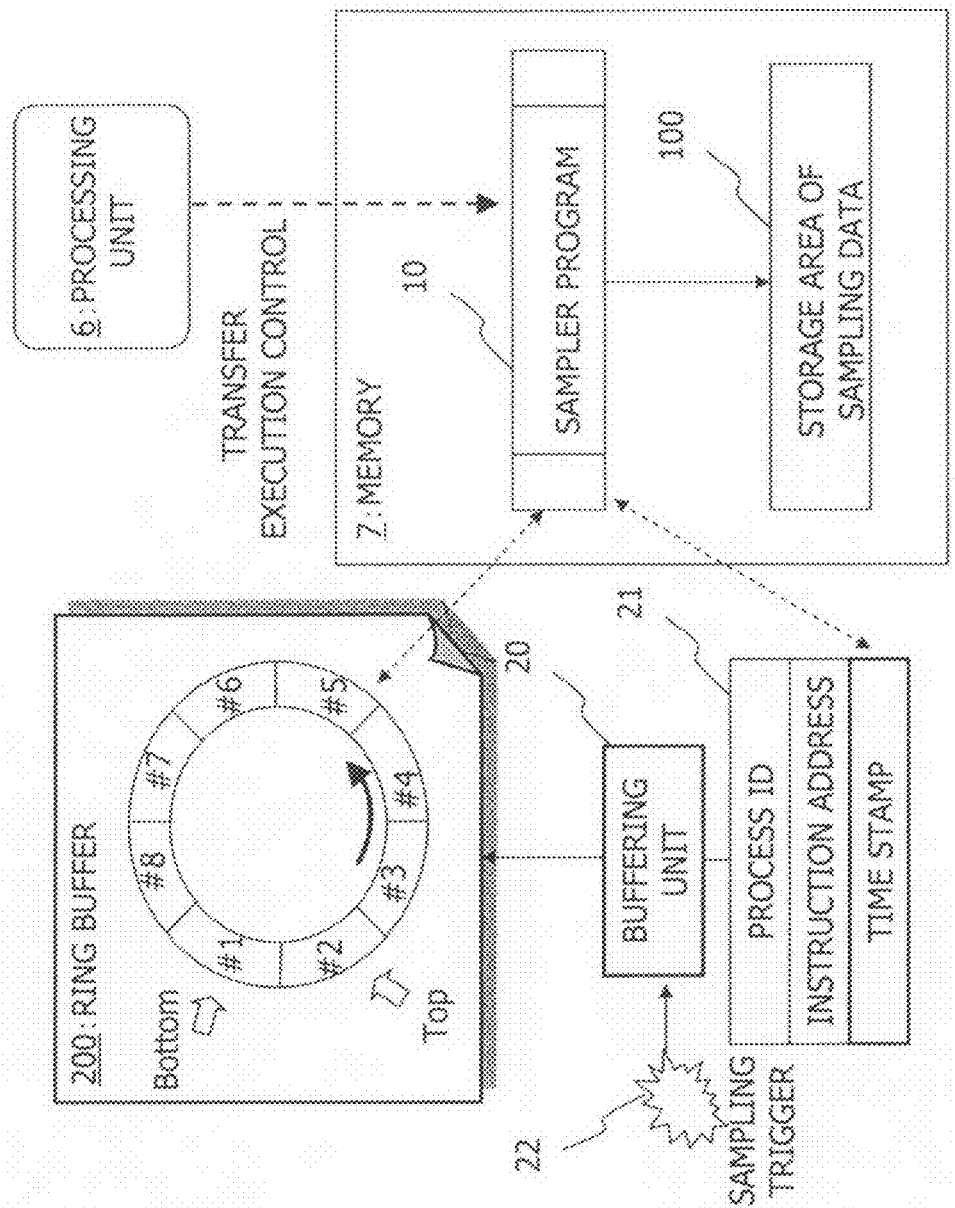
FIG. 7 illustrates an example of composition of the delay compensation at the time of power consumption sampling by buffering unit according to an embodiment.

FIG. 7 illustrates an example of composition of the delay compensation at the time of the power consumption sampling by the buffering unit according to the embodiment 3. This example explains the technique of solving "the delay problem of electric power measurement" mentioned above, using the sampling method based on power consumption.

The computer apparatus 1 is equipped with the ring buffer 200 which a buffering unit 20 uses for recording a requiring information cyclically as its archive destination.

The computer apparatus 1 samples information (for example, a virtual machine ID (identifier), a process ID, an instruction address (a branching agency, a branching destination), etc.) required for profile analysis after electric power measurement at every extraction trigger generating, attached with the time stamp (counter value) by a time stamp counter (TSC). These data are recorded on the ring buffer 200 as the trace information 21.

Namely, in the power consumption sampling according to overflow interruption of the power counter 4, the trace information 21 required for profile analysis is recorded on the ring buffer 200 at every trigger generating in the background, the time which delay compensation is carried out is compared with the time stamp of the data saved at the ring buffer 200, and applicable proper information is extracted by the time stamp at the time of a sampling for every overflow interruption.

In addition, the following two kinds of techniques can be considered for the sampling at the time of overflow interruption from the power counter 4.

The first technique is what records only information required for specifying an applicable program from the ring buffer 200 at the time of interruption. In the timing of overflow interruption, it is the technique of deducing the applicable program which caused overflow from the data of the time stamp by the TSC and the ring buffer 200.

The second technique is what collects and records the whole data of the TSC and the ring buffers 200 at the timing of interruption. It is the technique of deducing the applicable program leading to overflow at the time of the profile analysis after measurement.

While the second technique has a demerit that volume of extraction data becomes huge compared with the first technique, it has a merit that the load under measurement by the sampling program can be diminished.

The present invention can ask for the applicable program leading to overflow by grasping the delay time in this measurement environment as correction value beforehand and comparing the time stamp on the ring buffer 200 with the time rectified by the time stamp at a sampling.

That is, in the present invention, it is characterized that the information of the right applicable program which should be used for a profile can be deduced from both the extraction data and the time stamp on the ring buffer 200.

Figure 8:
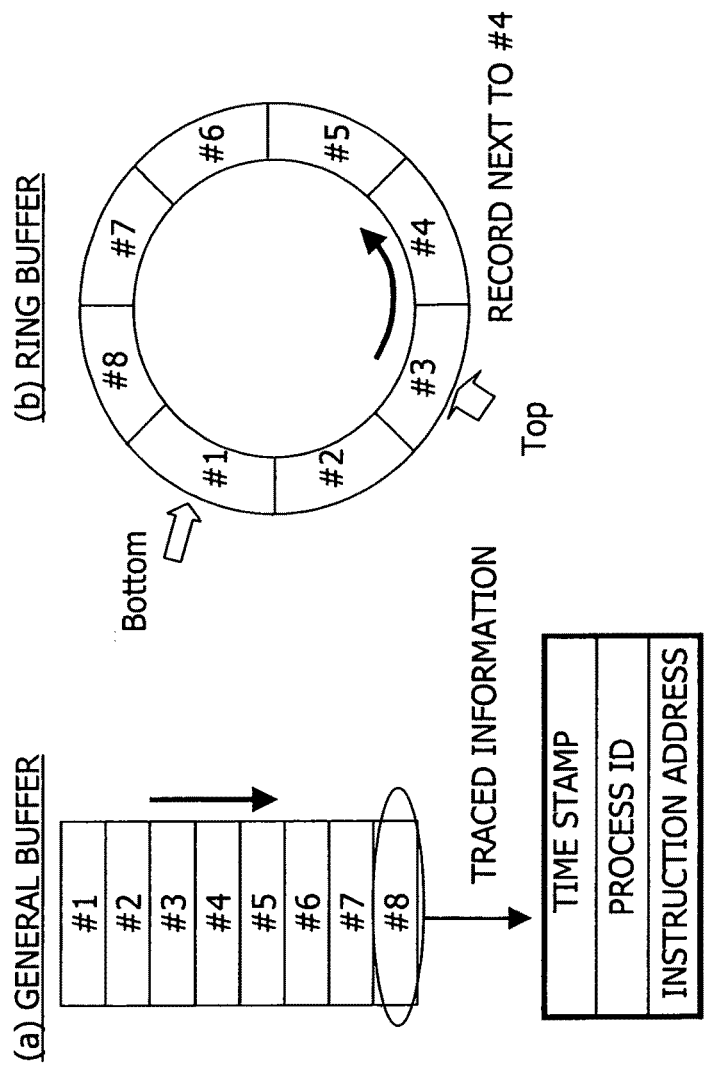
FIG. 8 is a figure explaining the structure of the ring buffer applied to an embodiment.

FIG. 8 is a figure explaining the structure of the ring buffer applied to the present invention. FIG. 8(*a*) shows an example of the usual buffer which will be stopped if a buffer becomes full, and FIG. 8(*b*) shows an example of the ring buffer which continues carrying out overwriting by recording the data in circle.

This example is shown by a buffer of 8 block configurations, wherein the trace information 21 consisting of a time stamp, a process ID, and instruction address makes 1 block.

In the case (a) of the usual buffer, if a whole block is filled with the data, it will be in a halt condition, but in the case (b) of the ring buffer 200, if it is filled from block #1 to block #8, data will be overwritten cyclically. Therefore, if the last data is block #3 (Top), the latest data will be recorded on the following block #4.

The data recorded on the above-mentioned ring buffer 200 is automatically sampled by the buffering unit 20 in the background apart from overflow interruption. The trace information 21 which consists of, for example, a time stamp, a process ID, and address is recorded on the ring buffer 200 as 1 block for every extraction trigger 22 which make a trigger events, such as a branch instruction, switching of a virtual machine, and a process, etc. (When making branch generating into a trigger, it is thinkable to record the addresses of both a branch destination and a branch original as an instruction address.

Figure 9:
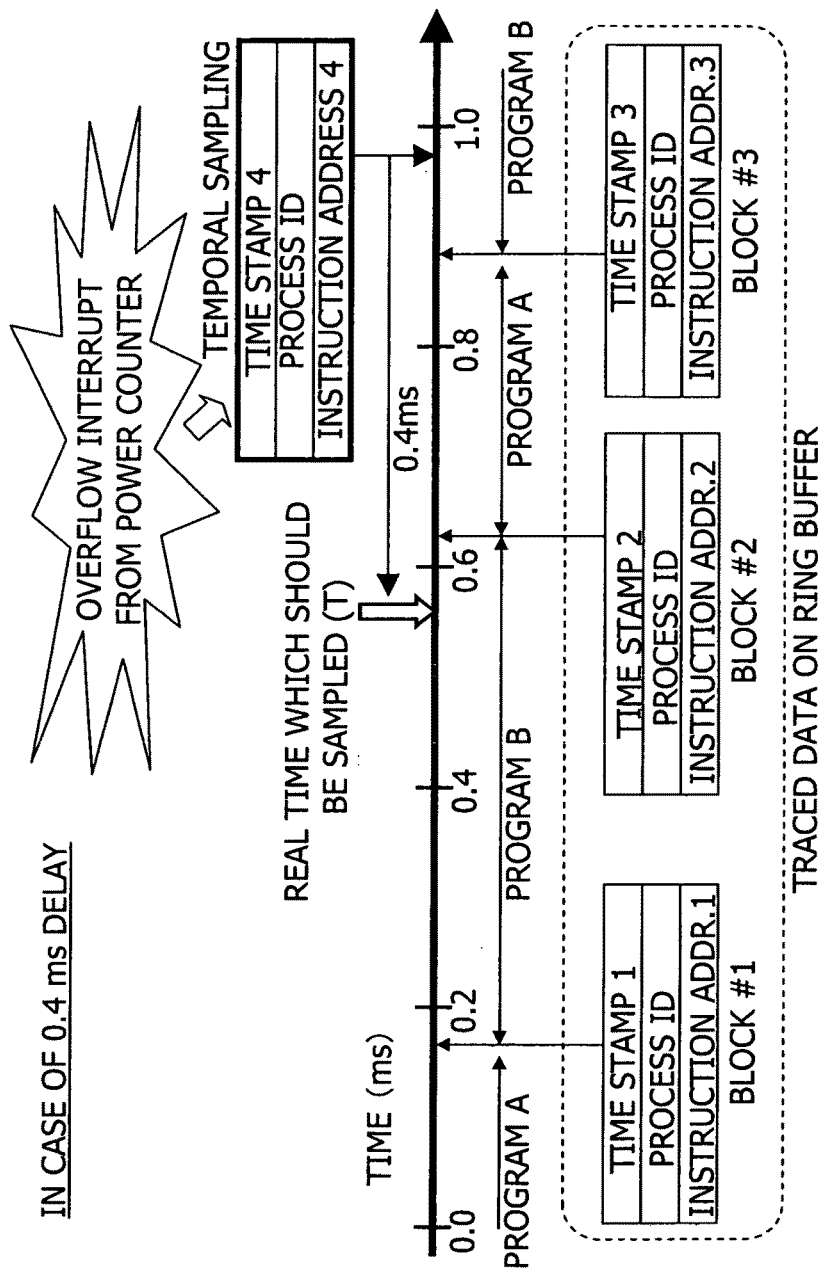
FIG. 9 is a figure explaining the data extraction by the time comparison which added the delay compensation according to an embodiment.

FIG. 9 is a figure explaining the data extraction by the time comparison which added the delay compensation according to the embodiment 3.

The process of data extraction of using for profile analysis is shown below.

(1) The original time (T) which should be sampled from the time stamp and delay time (0.4 ms) is asked as a temporary sampling by overflow interruption of the power counter 4.
(2) The original time (T) is compared with the time stamp in the trace information 21 currently recorded on the ring buffer 200.
(3) As a result, it is found that there is the part of the program which should be sampled between "instruction address 1" and "instruction address 2" and the program B is extracted as sampling data of arbitrary addresses (or virtual machine ID, a process ID, etc.). Thus a right profile of power consumption becomes possible.

Embodiment 4

In case that the CPU consists of multi cores and electric power measurement makes the whole chip the measuring object, only the above-mentioned embodiments 1-3 cannot respond to asking for power consumption profile for every core.

So the profile technology judging "which program of which core consumes many electric power" is required for the case of multi core CPU.

Although electric power measurement of one CPU-chip unit has been described in cases of the embodiments 1-3 until now, the technique of realizing the power consumption profile for every core unit in the multi core CPU is described as followings.

In addition, the "core-to-power index" used by the following explanation is an index value on the CPU proportionally related with power consumption, and can be easily measured per core, which is corresponding "temperature", a "CPU activity ratio", the "number of instruction", etc., for example.

In this example, a "core-to-power index" is adopted for the "number of instruction". Measurement of the "core-to-power index" can be measured by equipping each core with a performance event counter etc., for example, although not illustrated.

Additionally, although the case that the number of cores of CPU is four was taken up in the embodiment, the present invention is not limited to this.

Figure 10:
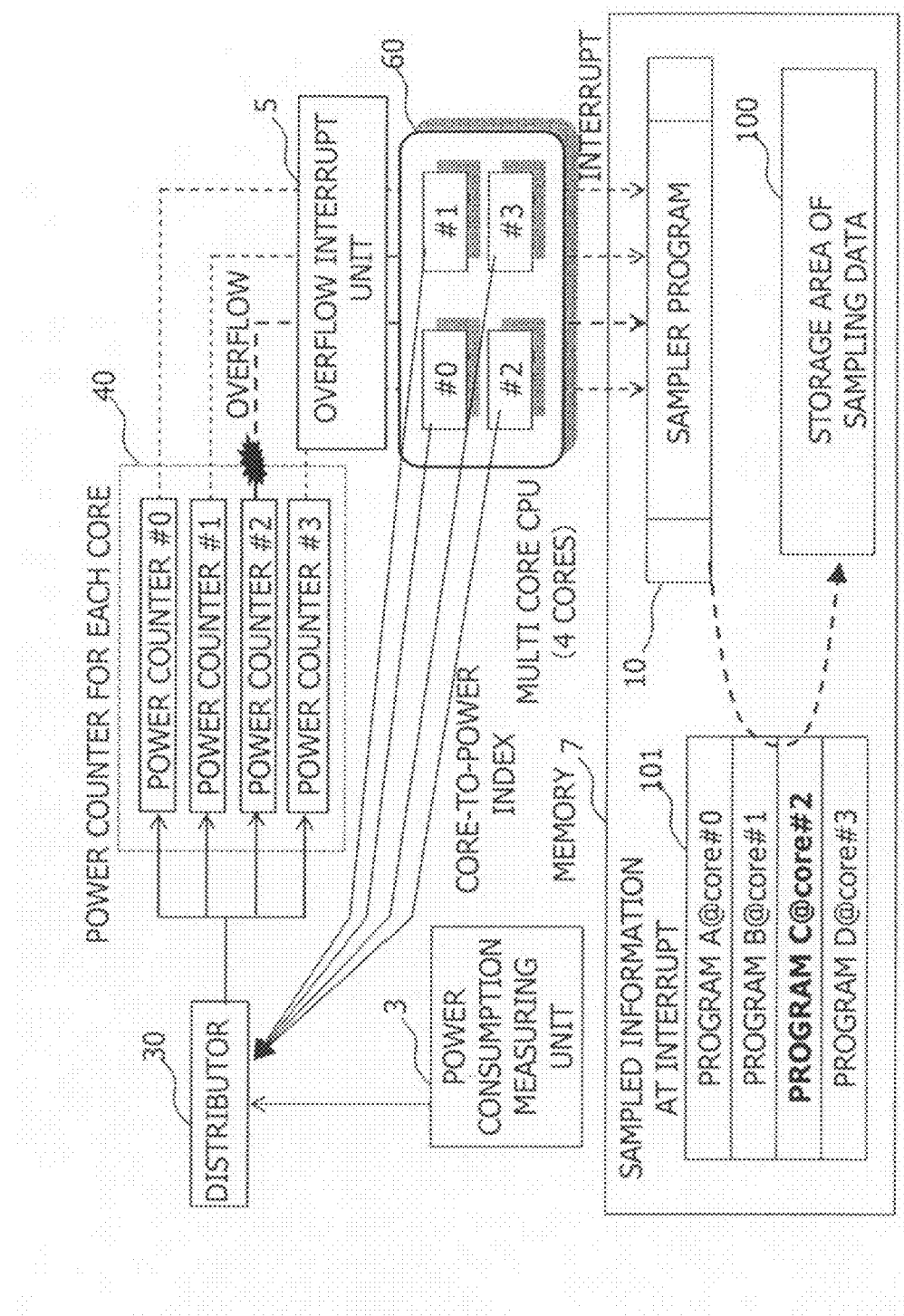
FIG. 10 shows an example of composition of the apparatus for gathering the value of power consumption by distributed accumulation for every core of the CPU according to an embodiment (Part 1).

FIG. 10 illustrates an example of composition of the measurement electric power value extraction by the distribution addition for every core based CPU (Part 1).

The computer apparatus 1 has multi core CPU 60 (core #0-#3), and the power counter 40 (the power counter #0-#3) is arranged corresponding to the core #0-#3. Periodical electric power measurement is performed by the power consumption measuring unit 3.

It has the distribution addition distributor 30 which distributes the measurement result of power consumption based on the core-to-power index.

When the power counter #1-#3 for any one of every cores overflows, the overflow interrupt unit 5 puts interruption into multi core CPU 60. Then, information of the program operated on the core corresponding to an applicable counter is extracted by the sampler program 10 (extraction means), the program information (a trace information including of an instruction address and a process ID, and a core electric power index, etc.) of the core concerned is stored in the extraction data storing area 100 of the memory 7 as the extraction information 101 at interruption.

The process of the distribution integration in the core unit for a measurement electric power value is as follows.

(1) The power consumption measuring unit 3 measures the number of executed instruction as a "core-to-power index" of each core in multi core CPU 60 at measuring periodical electric power.

(2) Next, the distributor 30 carries out distribution of the measurement electric power value in proportion to the number of instruction among the cores at that time, and puts each distribution value into the corresponding power counter value 40 for every core.

(3) As a result, overflow interruption from each power counter value 40 generates asunder. For example, when it is interruption from the power counter value 40 for core #2, only the operation program information on core #2 is sampled.

Figure 11:
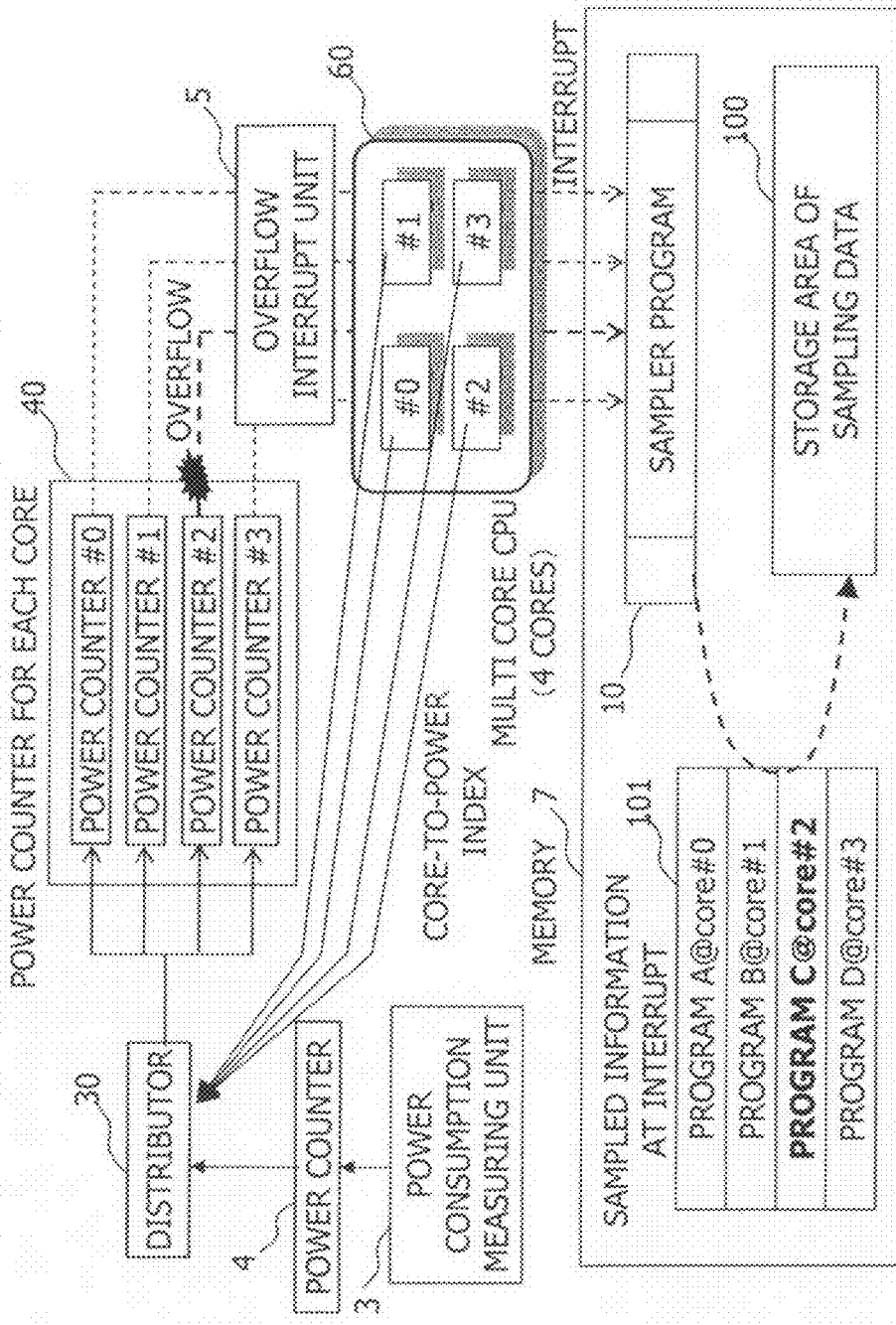
FIG. 11 illustrates an example of composition of the apparatus for gathering the value of power consumption by distributed accumulation for every core of the CPU according to an embodiment (Part 2).

Moreover, the example of composition of the measurement electric power value extraction by the distribution addition for every core based CPU (Part 2) is illustrated in FIG. 11.

This example is a modification of FIG. 10, and it is featured that the power counter 4 (the first power counter) is inserted between the power consumption measuring unit 3 and the distributor 30 as a counter of the first step for periodical electric power measurement.

When the power counter value 4 of the first step overflows, the distributor 30 distributes the electric power measurement result to the power counter 40 (#0-#3) which is prepared as a counter of the second step according to a "core-to-power index". And when any of the power counter prepared for every core overflows, only information of the program operated on the core corresponding to an applicable counter is extracted.

As mentioned above, in the example of FIG. 10, since the electric power measured value from the power consumption measuring unit 3 is directly distributed to the power counter 40 for every core, a certain amount of measuring period is needed. On the other hand, as illustrated in FIG. 11, the present invention can respond to the case where a measuring period is short, and it becomes possible to improve resolution of measurement.

Figure 12:
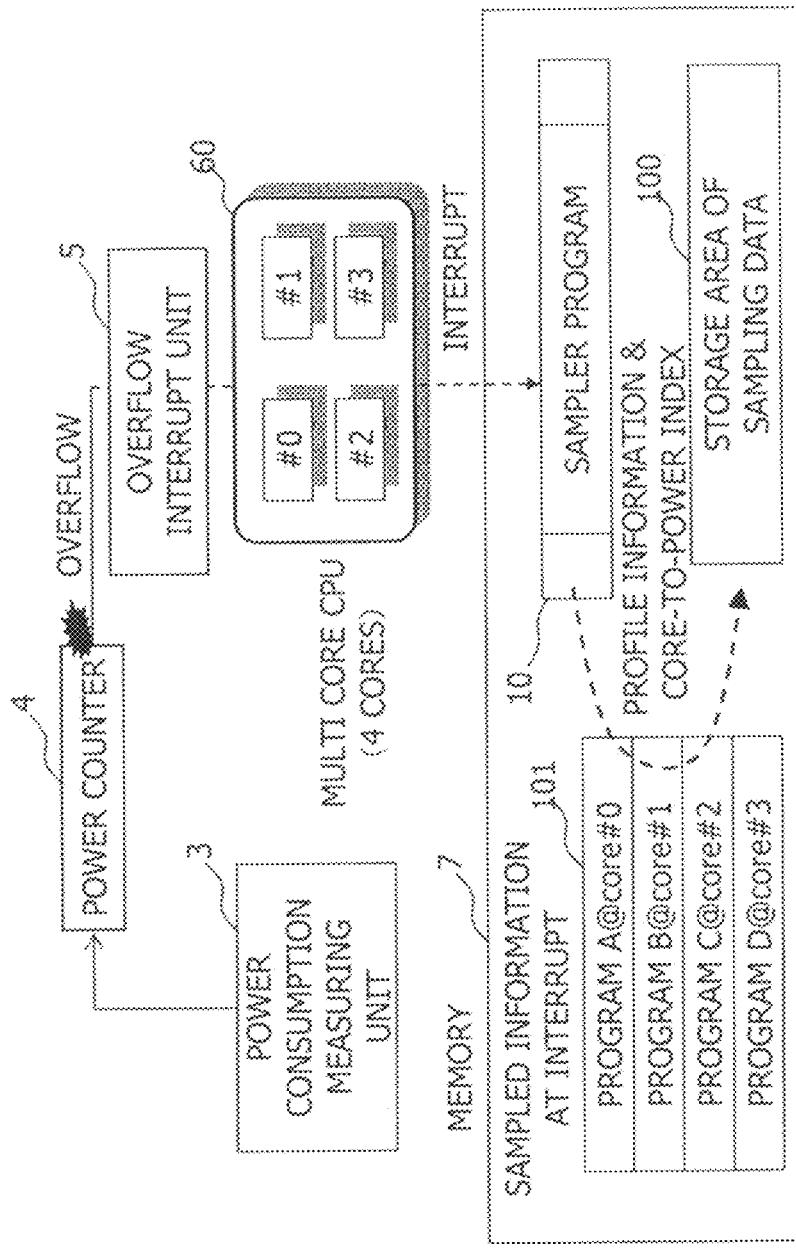
FIG. 12 illustrates an example of composition of the apparatus for gathering power consumption by priority attached on the core-based CPU unit according to an embodiment.
Figure 13:
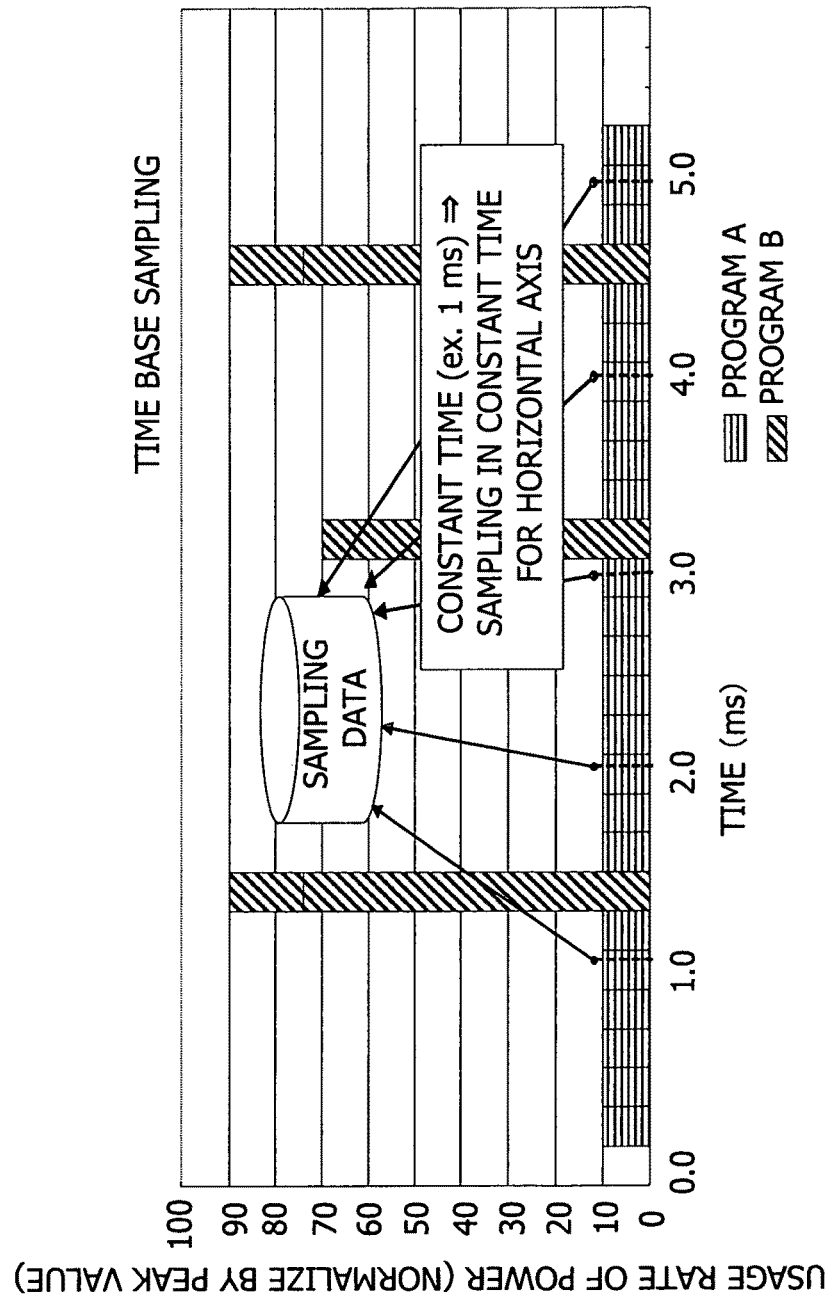
FIG. 13 illustrates an example of the program data gathered by the time base sampling in the conventional technology.

Furthermore, the example of composition of the power consumption extraction by weighting factor attached for the core unit of a power consumption base sampling is illustrated in FIG. 12.

(1) At the time of overflow interruption, as a "core-to-power index" of each core, the sampler program 10 (extraction means) extracts the number of instruction, and saves it in the memory 7 with the information on the operation program on each core each time, for example.

(2) And at analysis processing after sampling ends, the sampler program 10 collects the weighting factor for every core by the ratio of the number of instruction among cores, and outputs the profile result in every core.

Or, in the interrupt processing of (1), the count of the weight factor for each core is added to the extraction information, based on the ratio of the number of execution instructions at each overflow interruption (while the number of execution instructions is not preserved, it is referred on site), and it is good as totaling the weighting factor of each core according to the count value for the weighting factor, when the analysis of (2) is processed, and analyzing the profile in each core.

As mentioned above, according to the embodiment 4, even if a measured CPU is multi core composition, the sampling of a power consumption base per core will be attainable.

The field of this invention includes the field concerning the design of the computer, the construction and the management of a system, and the programming. Especially, it is used to gather basic data for "computer design, system construction/ management, and program optimization" that assumes "Power saving" to be a requirement.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer apparatus for measuring power consumption, the computer apparatus comprising:
    a power consumption measuring unit measuring a power consumption at an arbitrary constant period a plurality of times to produce a plurality of consumption values;
    a power counter integrating the consumption values of the power consumption measured by the power consumption measuring unit; and
    an overflow interruption unit interrupting a processing unit when said power counter overflows,
    the processing unit sampling a trace information including an executing instruction address and a process ID at which the processing unit is interrupted.

2. The computer apparatus according to claim 1, wherein integration of said power counter is stopped and restarted after said power counter has overflowed.

3. The computer apparatus according to claim 1, further comprising a ring buffer, the trace information with a time stamp being cyclically recorded in said ring buffer at every time of sampling,
    wherein, upon occurrence of overflow interruption of the power counter, the trace information is extracted out of said ring buffer based on the time stamp that is adjusted by a predetermined value.

4. The computer apparatus according to claim 3, wherein the trace information with a time stamp is cyclically recorded in said ring buffer at every time of sampling,
    wherein all stored data of said ring buffer are collected at every overflow interruption, and the trace information is extracted out of said ring buffer based on the recorded time stamps at the time of analysis.

5. The computer apparatus according to claim 1, further comprising:
    a multi-core processing unit including a plurality of cores;
    a plurality of power counters one-to-one corresponding to each of the plurality of cores in the multi-core processing unit; and
    a distributer distributing the measured value of the power consumption to the plurality of power counters by referring to a core-to-power index that is proportional to an electric power and is able to be measured per core;
    wherein the processing unit is interrupted by the plurality of power counters when either of the plurality of power counters overflows.

6. The computer apparatus according to claim 5, further comprising a first power counter that is positioned in front of said distributer and integrates measured values of the power consumption,
    wherein said distributer distributes the integrated value to the plurality of power counters based on said core-to-power index when said first power counter overflows.

7. The computer apparatus according to claim 1-5, further comprising a multi-core CPU including a plurality of cores,
wherein the processing unit extracts the trace information of all cores and the core-to-power index that is proportional to the electric power and is able to be measured per core.

8. A computer apparatus for measuring power consumption, comprising:
- a power consumption measuring unit measuring a power consumption at an arbitrary constant period a plurality of times to produce a plurality of consumption values;
- a power counter integrating the consumption values of the power consumption measured by the power consumption measuring unit; and
- a processing unit sampling a trace information including an executing instruction address and a process ID after clearing said power counter when a value of said power counter exceeds a predetermined threshold.

9. A method for sampling a data in a computer apparatus which measures a power consumption, the method comprising:
- measuring a power consumption at an arbitrary constant period a plurality of times to produce a plurality of consumption values;
- integrating the consumption values of the power consumption measured by the measuring in a power counter;
- raising an interrupt to a CPU when the power counter overflows; and
- sampling a trace information including an executing instruction address and a process ID when the interruption occurs.

10. A method for sampling a data in a computer apparatus measuring a power consumption, the method comprising:
- measuring a power consumption at every arbitrary constant period to produce a plurality of consumption values;
- integrating the consumption values of the power consumption measured by the measuring in a power counter;
- sampling a trace information including an executing instruction address and a process ID after clearing the power counter when the value of the power counter exceeds a predetermined threshold.

* * * * *

UNITED STATES PATENT AND TRADEMARK OFFICE
CERTIFICATE OF CORRECTION

| | | |
|---|---|---|
| PATENT NO. | : 8,645,718 B2 | Page 1 of 1 |
| APPLICATION NO. | : 12/545447 | |
| DATED | : February 4, 2014 | |
| INVENTOR(S) | : Yamamoto et al. | |

It is certified that error appears in the above-identified patent and that said Letters Patent is hereby corrected as shown below:

In the Claims

Column 11, Line 1, In Claim 7, delete "claim 1-5," and insert -- claim 5, --, therefor.

Signed and Sealed this
Twenty-second Day of April, 2014

Michelle K. Lee
*Deputy Director of the United States Patent and Trademark Office*